2,976,316
ALKYLAMINE REACTION PRODUCTS

Carl Boresch and Mathieu Quaedvlieg, Leverkusen, Germany, assignors to Farbenfabriken Bayer Aktiengesellschaft, Leverkusen, Germany, a corporation of Germany No Drawing. Filed July 31, 1956, Ser. No. 601,103
Claims priority, application Germany Aug. 4, 1955
5 Claims. (Cl. 260—501)

The present invention relates to alkylamine reaction products and more particularly it concerns a process for the manufacture of alkylamine reaction products.

According to the invention the process consists in reacting primary monoamines of the aliphatic series having at least 14 carbon atoms, in the form of their salts with organic acids, with epichlorhydrin at elevated temperatures.

As primary amines of the aliphatic series there may be considered for example palmitylamine, stearylamine and oleylamine; the amines derived from the corresponding synthetic hydrocarbons may also be used as starting materials. The organic acids on which the amine salts are based are preferably formic acid, acetic acid, propionic acid, acrylic acid or methacrylic acid. An excess of epichlorhydrin is expediently used so that at least 1½ mol of epichlorhydrin are used per mol of amine salt.

The reaction of the amine salt with epichlorhydrin is carried out in the melt or also in inert solvents such as toluene or xylene at elevated temperature, expediently at between 70 and 120° C.

The reaction products obtained according to the invention, which in general dissolve clearly in water are mixtures of compounds wherein the di-($\gamma$-chloro-$\beta$-hydroxypropyl)-alkylamine salt of the organic acid applied predominates. The products can be used for many purposes. As they distinguish themselves by a high substantivity for cellulose materials, they can for instance be used as plasticisers for these materials. Furthermore, they may serve as emulsifiers for the production of valuable aqueous wax (including paraffin) emulsions which excel in that they can be diluted with any desired amount of water.

The reaction products of the present invention can also be used for hydrophobing various materials, such as textiles, paper, leather and the like. For this purpose, the materials to be rendered hydrophobic, are impregnated with the alkylamine reaction products and subsequently heated to an elevated temperature for a short time. A particularly advantageous mode of hydrophobing comprises using the reaction products along with other hydrophobing agents, particularly with waxes (including high melting paraffins) as well as with zirconium or aluminium salts. The impregnations obtained by the hydrophobing treatment distinguish themselves by a high stability; in particular, they are also stable to strongly alkaline hot washing liquors.

The following examples serve to illustrate the invention without however, limiting the scope thereof; the parts are by weight.

Example 1

300 parts of stearylamine are melted in an agitator provided with reflux condenser, cooling and heating arrangement and treated with cooling at 90–95° C. with 80 parts of glacial acetic acid. The amine salt thus formed is then heated to 105° to 107° C., and 246 parts of epichlorhydrin are added at this temperature. The reaction mixture is maintained at 100–115° C. for 1 hour. The product obtained dissolves clearly in water.

Example 2

800 parts of octadecylamine are treated in an agitator provided with reflux condenser, cooling and heating arrangement with 179 parts of glacial acetic acid at 80° C.; 567 parts of epichlorhydrin are then run into the mixture at 100–110° C. The reaction mixture is maintained at 100–110° C. for about 1½ hours. The product obtained dissolves clearly in water.

Example 3

100 parts of solid paraffin are melted with stirring at 80° C. and 10 parts of the reaction product obtained according to Example 1 are then introduced into the melt. The mixture is then optionally treated with stirring with hot water. The emulsion thus obtained is very stable also after cooling; it can very successfully be used for plasticising cellulose materials.

Example 4

A mixture of 70 parts of solid paraffin and 30 parts of montan wax is melted at 90° C. together with 22 parts of the reaction product obtained according to Example 2 and then treated with stirring with 250 parts of water at 95° C. The emulsion thus obtained is very stable and can also optionally be diluted with cold water; it can be used for plasticising cellulose materials.

Example 5

A cotton fabric is impregnated with an aqueous solution containing 10 grams per litre of the reaction product obtained according to Example 1. The fabric is then squeezed off to 100 percent and dried at temperatures of between 125 and 135° C. The fabric thus treated has strongly waterrepellent properties.

Example 6

A cotton cloth is impregnated with a 3 percent aqueous emulsion of the composition indicated below. After squeezing off to 100 percent the cloth is heated to 120–130° C. for a brief period. The cotton cloth is thus rendered hydrophobic in an outstanding manner.

The emulsion applied was prepared as follows:

70 grams of solid paraffin, 30 grams of montan wax and 25 grams of the reaction product obtained according to Example 1 were melted at 90° C. and stirred with water of 95° C. to give a 10 percent emulsion. After cooling, 100 millilitres of a 10 percent zirconium acetate solution were added with stirring.

We claim:

1. A process for the manufacture of an alkylamine reaction product which comprises reacting an aliphatic acid salt of a primary alkyl monoamine with a stoichiometric excess of epichlorhydrin in the melt at a temperature of at least 100° C. but not in excess of 120° C., the monoamine having at least 14 carbon atoms and the aliphatic acid salt thereof being selected from the group consisting of lower alkanoic acid salts and lower alkenoic acid salts.

2. Process of claim 1 wherein at least 1.5 mols of epichlorhydrin are used per mol of amine salt.

3. A process for the manufacture of a water-soluble alkylamine reaction product which comprises reacting the acetic acid salt of stearyl amine with a stoichiometric excess of epichlorhydrin in the melt at a temperature of 100–115° C.

4. A process for the manufacture of a water-soluble alkylamine reaction product which comprises reacting the acetic acid salt of octadecyl amine with a stoichiometric excess of epichlorhydrin in the melt at a temperature of 100–110° C.

5. As a composition of matter, the reaction product obtained according to claim 1.

References Cited in the file of this patent

UNITED STATES PATENTS

| | | |
|---|---|---|
| 2,085,706 | Schoeller et al. | June 29, 1937 |
| 2,144,642 | Sloughton et al. | Jan. 24, 1939 |
| 2,206,090 | Haggenmacher | July 2, 1940 |
| 2,753,372 | Lundberg | July 3, 1956 |